(12) United States Patent
Doganata et al.

(10) Patent No.: US 8,626,735 B2
(45) Date of Patent: Jan. 7, 2014

(54) TECHNIQUES FOR PERSONALIZED AND ADAPTIVE SEARCH SERVICES

(75) Inventors: Yurdaer Nezihi Doganata, Chestnut Ridge, NY (US); Youssef Dressi, Ossining, NY (US); Lev Kozakov, Stamford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/431,380

(22) Filed: Mar. 27, 2012

(65) Prior Publication Data

US 2012/0185485 A1 Jul. 19, 2012

Related U.S. Application Data

(60) Division of application No. 12/169,306, filed on Jul. 8, 2008, now Pat. No. 8,224,857, which is a continuation of application No. 10/155,697, filed on May 24, 2002, now abandoned.

(51) Int. Cl.
*G06F 17/30* (2006.01)

(52) U.S. Cl.
USPC ........... 707/706; 707/713; 707/722; 707/736; 707/758; 707/791

(58) Field of Classification Search
USPC ................................................ 707/600–899
See application file for complete search history.

(56) References Cited

U.S. PATENT DOCUMENTS

| | | | |
|---|---|---|---|
| 5,819,265 A | 10/1998 | Ravin et al. | 707/5 |
| 5,873,080 A | 2/1999 | Coden et al. | 707/3 |
| 5,913,208 A | 6/1999 | Brown et al. | 707/3 |
| 6,182,068 B1 | 1/2001 | Culiss | 707/5 |
| 6,327,590 B1 | 12/2001 | Chidlovski et al. | 707/5 |
| 6,370,527 B1 | 4/2002 | Singhal | 707/6 |
| 6,480,843 B2 | 11/2002 | Li | 707/5 |
| 7,031,961 B2 | 4/2006 | Pitkow et al. | |
| 2002/0129062 A1 | 9/2002 | Luparello | 707/513 |
| 2003/0046098 A1* | 3/2003 | Kim | 705/1 |

OTHER PUBLICATIONS

Howe et al., "Savvy Search: A Meta-Search Engine that Learns which Search Engines to Query," AI Magazine, 18(2) (1997).
Lawrence et al., "Inquirus, The NECI Meta Search Engine," 7th Inter'l World Wide Web Conference, Brisbane, Australia, Elsevier Science, 95-105 (1998).
E.W. Selberg, "Towards Comprehensive Web Search," Ph.D. Dissertation, University of Washington, 61-65 (1999).
Lawrence et al., "Inquirus, The NECI Meta Seach Engine," 7th Inter'l World Wide Web Conference, Brisbane, Australia, Elsevier Science, 95-105 (1998).

* cited by examiner

*Primary Examiner* — Isaac M Woo
(74) *Attorney, Agent, or Firm* — Ryan, Mason & Lewis, LLP (57) ABSTRACT

Techniques are presented that include sending a query to one or more information sources associated with a category comprising one or more terms, wherein said one or more information sources are identified by a ranked list of information sources, and wherein said ranked list is generated by ranking a plurality of information sources based on scores for results returned by said plurality of information sources in response to a ranking query generated from said category, and obtaining results from said one or more information sources.

14 Claims, 7 Drawing Sheets

| INFORMATION SOURCE | SCORE (KEYWORD$_1$) | SCORE (KEYWORD$_2$) | SCORE (KEYWORD$_3$) | SCORE (KEYWORD$_4$) | SOURCE SCORE | SOURCE RANK |
|---|---|---|---|---|---|---|
| A | 50 | 76 | 55 | 20 | 201 | 3 |
| B | 59 | 94 | 44 | 100 | 297 | 1 |
| C | 78 | 19 | 39 | 23 | 159 | 4 |
| D | 20 | 80 | 70 | 44 | 214 | 2 |

TECHNIQUES FOR PERSONALIZED AND ADAPTIVE SEARCH SERVICES

CROSS-REFERENCE TO RELATED APPLICATIONS

This application is a divisional application of U.S. patent application Ser. No. 12/169,306, filed Jul. 8, 2008, incorporated by reference herein, which is a continuation of U.S. patent application Ser. No. 10/155,697, filed May 24, 2002, also incorporated by reference herein.

FIELD OF THE INVENTION

This invention relates to searching for information over a computer network, and, more specifically, the invention relates to techniques for personalized and adaptive search services.

BACKGROUND OF THE INVENTION

Computer networks used for knowledge searching and retrieval are well known. For example, see U.S. Pat. No. 5,873,080 to Coden et al., issued on Feb. 16, 1999; U.S. Pat. No. 5,875,446 to Brown et al., issued on Feb. 23, 1999; U.S. Pat. No. 5,913,208 to Brown et al., issued Jun. 15, 1999; and U.S. Pat. No. 5,819,265 to Ravin et al., issued on Oct. 6, 1998, the disclosures of which are hereby incorporated by reference. In all of these patents, a primary purpose is to provide better methods to retrieve relevant documents in response to user queries.

In order to improve relevancy, information is categorized into groups of subjects. The categorization of the text documents is one of the most effective methods to help users organize information. In general, the content of the text document is analyzed to determine the words and phrases that contribute to the context of the document. The document is then associated, based on the context and content, to one or more categories of a given taxonomy. Once the document is associated with a category of a taxonomy, the users can easily navigate within the taxonomy of their interest to find relevant information. The "Yahoo!" search Web site is designed based on this concept of categorization. Each document is listed under one category or subcategory.

Once the information is categorized based on a taxonomy, the users can narrow their search scope within a category or subcategory. This way they can increase the relevance of the documents that they retrieved. Today, most search Web sites are based on this principle.

The context of the query in general is very important to be able to return the relevant results. As an example, if the word Java is used with the context of a coffee type, then this information must be communicated to the search engine. Otherwise, the search engine would return results out of context such as references to a computer language or a germ or a lyric. One way to associate a context to a query is to look at a user profile. A user profile contains a set of categories or a taxonomy that identifies user interests. When the user forms a query, it can be associated to one or more categories, which helps to determine and possibly expand the context of the query.

The amount of information published over the Internet grew so rapidly that it became very difficult to find the information. In order to make the searching of Internet content more practical, categorization of the Web content was proposed. The unstructured Web content was categorized by using specific taxonomies. Today, for many search engines, users are expected to know and select the category for the information that they look for. In general, the categories are organized in a tree structure. There are seven to 15 main categories, such as Art, Business, Computers, Education, Entertainment, and the other subcategories are organized under these main categories. In order to cover the information space properly, seven to 15,000 subcategories were proposed.

For a user who has a very specific area of interest, these categories are less than useful at times. For instance, a category that is useful to a particular user may be either too specific to belong to a general taxonomy or will make navigation difficult for the user, as the user might have to navigate through much of a taxonomy tree. As an example, the category "Think Pad Model 600" is a very specific category which is not part of a general taxonomy. One other problem of generalized taxonomy trees is the fact that these trees are ever growing and constantly need pruning. Consequently, new categories are added in time, and old categories are deleted. Users are expected to keep up with the changing taxonomy trees as they perform their searches. Yet another problem is that not all users are familiar with the categorization scheme. It takes an effort on behalf of the users to navigate through the taxonomy tree and find the information searched for within that category. This can cause, among other problems, a lack of returned information.

Metasearch systems help to alleviate the problem of insufficient returned information. A metasearch system is not a search engine but a system that merges results from a multitude of search engines. Thus, in the case of metasearch systems, a query is sent to a multitude of information sources and the results are grouped and merged. While a metasearch system retrieves more information, at the same time, the amount of returned information can be overwhelming.

Therefore, a need still exists for allowing users to search through a massive amount of information, yet provide users with more meaningful results than currently presented to the user when searching for information.

SUMMARY OF THE INVENTION

Aspects of the present invention improve upon conventional information search techniques by automatically selecting information sources that are most relevant to user queries. This is done by analyzing results of searches returned by information sources for queries and by ranking the information sources based on this analysis. The information sources that have high rankings for a query are subsequently used to search for relevant results for that query. In other words, information sources can be selected based on their rankings for a particular query. This process can be adaptive, as the returned results of old queries can be analyzed at a later date to update the ranking of the information sources, automatic searches can be performed to update the ranking of the information sources, new queries can be used for analysis and stored, new information sources added, and old information sources deleted.

Additionally, aspects of the present invention use an electronic library, referred to as a "linguistic library" herein, that is useful for storing personal categories for one or more users. Each personal category is associated with corresponding keywords and ranked lists of information sources. The personal categories help to expand a user query and to relate a user query to the ranked information sources. The library can also contain general categories, taxonomies, and dictionaries used to help broaden and interpret user queries. A user can interact with the linguistic library to select an appropriate modified query that is based on his or her original query and includes information determined from the linguistic library. Alternatively, the user can submit his or her original query.

A more complete understanding of the present invention, as well as further features and advantages of the present invention, will be obtained by reference to the following detailed description and drawings.

DETAILED DESCRIPTION OF PREFERRED EMBODIMENTS

The present invention allows a user query to be categorized into a number of categories, where each category is associated with a ranked list of information sources. The categories effectively allow a user query to be "expanded" into a number of keywords that can be used as query terms. The categories also allow a user to navigate information instead of or in addition to writing his or her own user query. The categories, in one aspect of the invention, also contain a ranked list of information sources. To rank the information sources, a query that comprises a number of keywords is sent to each information source. The set of returned results from an information source is used to determine a ranking. The ranking is then used to search specific information sources with a user query that corresponds to the category. Generally, a specific user query is sent to only the highest ranking information sources. However, the user has the ability to override this. The results presented to the user generally come from a subset of all the information sources.

In one embodiment, there are personal and general categories. The personal categories are entered through interaction by the user with a linguistic library, and generally when the user is performing his or her searches. The general categories are categories that are pre-loaded. The general categories thus provide a user with an already available source of query terms for many queries.

In one embodiment of the invention, new user queries are generated, information sources are queried, and information sources are ranked based results returned against new user queries. The ranking in this embodiment is performed "offline," so that the user experiences no slow down in functionality. The new user query may be based on a previously entered user query, which is given its own personal category or is related to a general category. If the user enters a user query that has no corresponding category, then it is beneficial to associate a category to the query. Once a category is associated with the query, then the corresponding keywords and the ranked list of information sources are also associated with the query. A linguistic library is used to find associated categories for queries that are not already categorized. Users may choose to interact with the linguistic library to determine the personal or general category of a query. The linguistic library may return one or more personal or general categories in order for the query to be categorized. This is done by using dictionaries specific to the domain of interest. The user may decide which category is the most appropriate. Optionally, the user may decide to send his or her original query, without any data from the linguistic library. In this situation, in one embodiment of the present invention, the query is treated as a metasearch and results are returned from all information sources.

Ranking the information sources generally takes place offline, as retrieving and ranking documents can take a measurable amount of time and may interfere with the speed experienced by the user. Additionally, if a user has added keywords to a category or modified a category in some other way, it is beneficial to again query the information sources and again determine rankings for the information sources. Furthermore, queries may be generated automatically from the keywords that represent a category to determine the rank of an information source. The keywords are sent to information sources and the returned results are analyzed for rankings. Each category is associated with a number of keywords, and the query is determined from the keywords corresponding to the category. Categories may be added, deleted, or modified, and information sources may be added, deleted, or modified.

The present invention overcomes a problem with metasearch systems. As explained previously, a metasearch system sends a query to a multitude of information sources and the results are grouped and merged. The results are either arranged based on the original scores of the documents or are grouped based on the search engine. If the relevance of these information sources and their categories to the query is not known, the returned results are usually not satisfactory. By ranking the information sources, the present invention has the ability to return a higher percentage of relevant documents to the user in a faster fashion. In other words, embodiments of the present invention can determine that several information sources return more relevant documents. If these information sources are searched first, then the results placed highest in a list of returned documents will generally be more pertinent than the results obtained by the metasearch system.

Additionally, the arrangement by original scores, where an "original score" is a score an information source gives to a document, is not effective as it could be. In particular, original scores are based on scoring systems from each of the information sources. As many information sources use different document ranking schemes, then uniformity of scoring is not guaranteed. For instance, a document given a score of "90" by one information source may be only given a score of "50" by another document source. Moreover, as the information sources themselves are not ranked by a metasearch system, there is generally wasted effort. In particular, if it is known, using the techniques of the present invention, that three information sources give excellent results for a particular query, then sending a query to information sources other than the three information sources could be considered wasted effort, as the results from the other sources are likely to be less relevant.

The user generally will be given the ability to control how results are viewed. The results could be viewed on one window by ranked information sources or by using rankings, provided by each information source, for pages within the returned results from the sources, or could be viewed so that each ranked source is in a separate window. There are additional options known to those skilled in the art.

Figure 1:
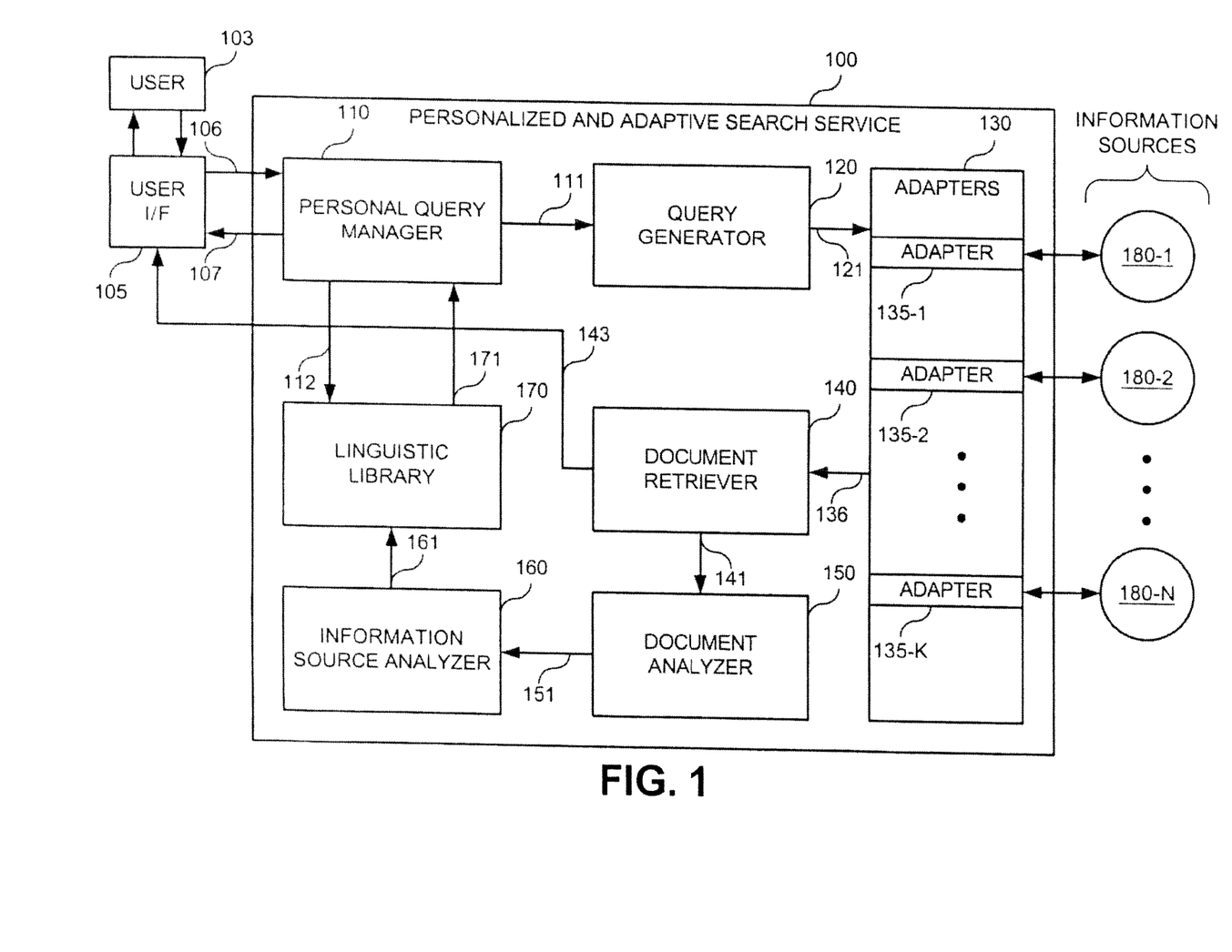
FIG. 1 is a block diagram of an exemplary personalized and adaptive search service, in accordance with one embodiment of the present invention.

Turning now to FIG. 1, a personalized and adaptive search service 100 is shown interacting with a variety of information sources 180-1 through 180-N (collectively, information sources 180) and interacting with a user 103 through user interface 105. Personalized and adaptive search service 100 comprises a personal query manager 110, a query generator 120, adapter interface 130, document retriever 140, document analyzer 150, information source analyzer 160, linguistic library 170, and personal query manager 110. Adapter interface 130 comprises a number of adapters 135-1 through 135-K (collectively, adapters 135). It should be noted that the blocks that are shown in FIG. 1 are demarcated as such merely for exposition. The blocks themselves may be combined or even further divided, through techniques known to those skilled in the art. For instance, the blocks information source analyzer 160 and document analyzer 150 may be combined into a single functional equivalent of the two blocks.

Information sources 180 are any type of information sources available, such as Internet databases, Internet search engines, or public or private databases. Any electronic repository of information that can be searched by sending a query and receiving a response can be an information source 180.

User 103 interacts with personalized and adaptive search service 100 through user interface 105. User interface 105 can comprise a monitor, keyboard, mouse, and other devices suitable for interacting with a computer system. In this embodiment, the personalized and adaptive search service 100 is a computer system or perhaps a server that the user interface 105 interacts with through a networked computer or a dumb terminal. Additionally, the user interface 105 may comprise a hand-held computer, Personal Digital Assistant (PDA), or cellular phone that access the personalized and adaptive search service 100 through a radio frequency network interface or hardwired network interface. Additionally, personalized and adaptive search service 100 may reside in a PDA or the like. User interface 105 can comprise any device suitable for communicating information from a user to a computer system.

In one embodiment of the present invention, there are two basic modes of operation for personalized and adaptive search service 100: an "online" mode and an "offline" mode. In the online mode, a user 103 creates requests 106 and receives results 143 through the user interface 105. In this mode, the requests 106 can be expanded by the linguistic library 170 to include additional keywords and search terms (not shown) and include a ranked list (not shown) of information sources 180 to use. The ranked list can include rankings of all of the information sources 180 or optionally only a number of the highest ranking information sources 180. The number of highest ranking information sources 180 can be user selectable. Additionally, the ranked list can be passed to personal query manager 110, which can then determine, through user preferences or other criteria, how many of the information sources 180 are selected. Generally, this selection will be done on ranking, so that a number of highest ranking information sources 180 are used, but other criteria, such as Internet download speeds, could be used. Moreover, the user 103 can enter in a request 106 and the personal query manager 110 can, by accessing linguistic library 170, determine an expanded query 171 based on information in the linguistic library 170. This expanded query is shown to the user through feedback 107. The user can accept this expanded query, modify it, or use the original query. Thus, feedback 107 provides an opportunity for the user to interact with the personal query manager 110 and linguistic library 170.

In the offline mode, the personalized and adaptive search service 100 will communicate a number of queries to the information sources 180 and will then rank the information sources 180. The queries sent to the information sources 180 are the keywords associated with different categories stored in linguistic library 170. This way, a ranked list of relevant information sources 180 is obtained for each category. This offline mode can be adaptive, as the linguistic library 170 can automatically send keywords corresponding to categories to the personal query manager 110, which then provides queries, through personalized and adaptive search service 100, to information sources 180. The returned results from searches on the information sources 180 can then be ranked and the rankings stored in linguistic library 170.

In the present specification, it will be assumed that personalized and adaptive search service 100 has both offline and online modes, although it should be understood that these modes can be combined into a single mode where information sources are ranked with each query of one or more information sources 180.

In the online mode, the user 103 sends a user request 106, through user interface 105, to the personal query manager 110. The user request 106 contains a description of a category or topic that the user is interested in, a user query, or both. Descriptions of categories and the categories themselves are stored in linguistic library 170, which is described below in more detail in reference to FIGS. 2 and 3. Generally, the user 103 will be using a Graphical User Interface (GUI) in the user interface 105, which will allow the user 103 to type in a user query or a description of a category, or select a category. Categories are used to determine the context of a query. For instance, if a user query, in request 106, is "java," it is sent to the linguistic library 170 for further analysis. The linguistic library 170 may have multiple categories associated with the query "java," such as "computer language," "islands of Indonesia," "types of coffee." If the user has previously used this query within the context of "computer language," then only "computer languages" is returned as the category. Otherwise, the user is asked to select from multiple categories and his selection is stored in his personal profile in 170.

The personal query manager 110 takes the request 106 and generates a modified query 111 from input from the linguistic library 170. The linguistic library 170 uses the request 106 and, through techniques described in more detail in reference to FIG. 2, expands the request 106 into an expanded query 171. Modified and expanded queries are discussed in more detail below.

If the request 106 is already associated with one of the personal or general categories that are stored in the linguistic library 170, then the query generator 120 sends a query to a certain number of information sources 180. Generally, only a number of the highest ranking information sources 180 are used to perform the search. However, it is possible to send the query to all of the information sources 180 and then use the ranking for each of the information sources 180 to determine which results are displayed or the order in which results are displayed. The document retriever 140 retrieves the results, performs any formatting or other modifications, and sends the formatted results 143 back to the user 103 through user interface 105.

In order to retrieve relevant results, a user query is associated with a category. If there is a match between a user query and a category, then the keywords associated with the category are used to search. If there is no match, then the user interacts with the linguistic library 170 to determine an appropriate category. The details of generating query terms specific to a user category are discussed in reference to FIG. 2. If an appropriate category, either a user category or a general category, does not exist, then the personalized and adaptive search service 100 acts like a metasearch device, in that personalized and adaptive search service 100 sends the user query to each of the information sources 180 and returns the results to the user 103 through returned results 143. Additionally, the user may choose to not interact with information sources 180 or may choose to have the personalized and adaptive search service 100 act as a metasearch device, regardless of whether or not an appropriate category can be found.

In offline mode, personalized and adaptive search service 100 operates as follows. The personal query manager 110 will send a number of queries to the information sources 180. Each query generally comprises, as shown more particularly in FIG. 3, one or more keywords. A query is sent to the query generator 120, which performs formatting specific to each of the information sources 180. Some information sources 180 may allow character strings to be sent to them as queries; other may require a specific format. The query generator 120 performs any needed formatting. Thus, the query generator 120 might create several different final queries 121, which are then directed to the appropriate information sources 180.

Adapters 130 is a central location used to store a number of adapters 135. Each adapter 135 is adapted to interact with one or more information sources 180. Each adapter 135 performs low level communication with an information source 180. For example, the adapter 135-1 could be an adapter for use with a database on the Internet, and the adapter 135-1 would open and close communications with the information source 180 using protocols specific to the information source 180. Usually, there will be fewer adapters 135 than information sources 180, as many information sources 180 will use the same protocols. In the example of FIG. 1, there are K adapters 130 and N information sources 180, where K<N. Additionally, there could be an adapter 135 that exists but no information source 180 that corresponds to it.

Each final query 121 is transmitted, through adapters 135 to the N information sources 180. Each information source 180 returns results 136. The document retriever 140 keeps track of the results. In particular, the document retriever 140 catalogs results from each of the information sources 180. The cataloging by the document retriever 140 includes, in one embodiment, for each document, a title and a Uniform Resource Locator (URL). Any technique for allowing a system to access the document may be used by the document retriever 140. Additionally, the number of documents returned by each information sources 180 is retained. This information is sent to the document analyzer 150 as returned results 141. These returned results may be stored for later analysis, which is used to update the rankings of the information sources. In online mode, this information is also sent to the user as returned results 143.

Generally, the returned results 141, 143 will be a list of HyperText Transfer Protocol (HTTP) addresses, possibly along with titles, brief descriptions, and other information. For instance, an exemplary list of three entries in a returned result 141, 143 for the query "java and program and language" could be the following:

1. "Language Basics," http://java.sun.com/docs/books/tutorial/java/nutsandbolts/

2. "Essentials of the Java™ Programming Language, Part 1," http://developer.java.sun.com/developer/onlineTraining/Programming/BasicJava1/

3. "Java—Webopedia.com," http://www.webopedia.com/TERM/J/Java.htm

In the above returned results, the titles are "Language Basics," "Essentials of the Java™ Programming Language, Part 1," and "Java—Webopedia.com." The HTTP addresses corresponding to these titles follow the titles. Document retriever 140 will generally send complete entries in the returned results 143 to the user 103. In other words, the entire entry, including title, HTTP address, and any other information, will be sent.

It is also possible for the returned results 141, 143 to include the documents themselves, instead of HTTP addresses. It should also be noted that the returned results 141, 143 can include scores created by the information sources 180.

The document analyzer 150 analyzes the documents by determining a score for each document. The query is used to determine the score for a document. The score is determined through techniques known to those skilled in the art. Such techniques are described in Selberg, "Towards Comprehensive Web Search," Ph.D. Dissertation, University of Washington (1999); Howe and Dreilinger, "Savvy-Search: A Meta-Search Engine that Learns which Search Engine to Query," AI Magazine, 18(2) (1997); Lawrence and Giles, "Inquirus, the NECI meta search engine," Seventh Int'l World Wide Web Conference, Australia, 95-105 (1998), the disclosures of which are hereby incorporated by reference. By using a single technique to score documents for each of the information sources 180, there is uniformity of scoring for each of the information sources 180. For instance, it is possible to use scores from the information sources 180 themselves to perform the scoring. However, the techniques used to score documents for each information source 180 will likely differ, and some information sources 180 may not use any scoring mechanisms. Thus, using the same technique to score each document provides uniform scoring. It should be noted that two or more techniques may be used to score documents, and scores from each technique can be combined, such as through an average. However, each technique can take a measurable and sometimes substantial amount of time. Consequently, using only one technique is suitable for most applications.

The document analyzer 150 sends data 151 about an information source to information source analyzer 160. The data 151 comprises a list of document scores and a total number of returned documents for each information source 180. Information source analyzer 160 analyzes the scores and total number of returned documents and ranks sources. Exemplary analysis techniques are described below in more detail in reference to FIGS. 4 through 6. The information source analyzer 160 sends the ranked list 161 of information sources 180 to the linguistic library 170, along with the associated query and category. When the linguistic library 170 receives the ranked list of information sources 180 through link 161, the linguistic library 170 updates the category with the ranked list 161 of information sources 180, as described below in reference to FIG. 3.

Thus, in offline mode, the personalized and adaptive search service 100 ranks information sources 180 so that future requests 106 by a user will be transmitted, in online mode, to more appropriate information sources 180. The personalized and adaptive search service 100 identifies the most relevant information sources 180 for most, if not all, requests 106 by a user.

Although reference numerals 106, 107, 111, 112, 121, 136, 141, 151, 161, and 171 have been primarily described by the data passing through these "links," it is not necessary to have any type of hardware implementation for these links. For instance, link 161 simply indicates that data is passed between modules. The actual link 161 could simply be a reference to an object or memory location, as is known in the art. Any mechanism suitable for passing data may be used as a link. Moreover, multiple types of data can pass through any link.

It should be noted that personalized and adaptive search service 100 could be implemented as a "plug in" to a browser or similar software. In this configuration, the personalized and adaptive search service 100 would operate largely at a remote site out of sight for most users.

Figure 2:
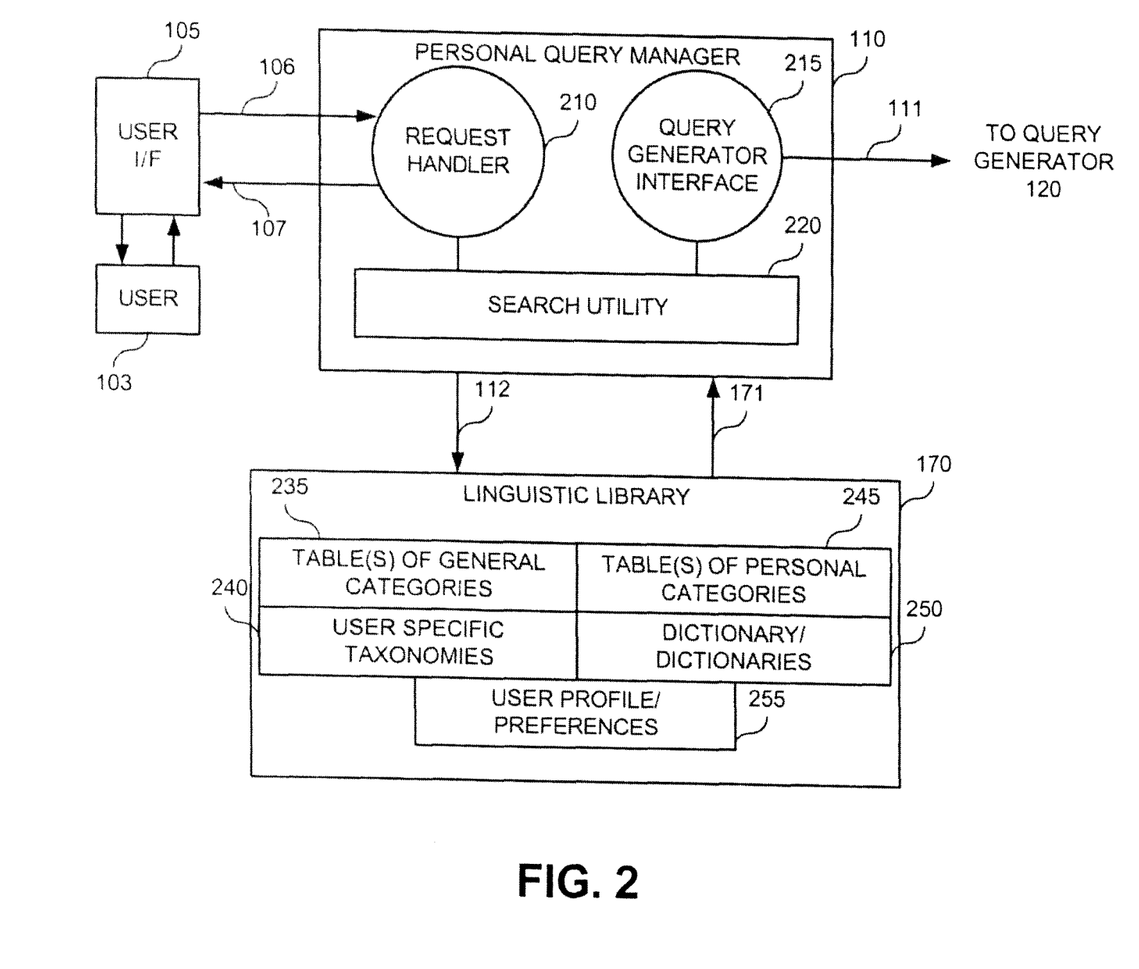
FIG. 2 is a block diagram of an exemplary personal query manager interacting with a linguistic library and a user, in accordance with one embodiment of the present invention.

Before turning to FIG. 2, it is worthwhile to provide an example. If a user enters the request 106 of "java," then, as discussed above, the personal query manager 110 will access the linguistic library 170 to determine if there are any suitable categories for this request 106. The user 103 can then be presented with categories such as "computer language," "islands of Indonesia," and "types of coffee." If the user 103 select "computer language," the fact that the user selected this category and not another category may be stored in linguistic library 170, particularly in the user profile/preferences (described below). Once the user selects a category, the linguistic library 170 will provide keywords associated with that category. Alternatively, the keywords could be provided at the same time as the categories are provided. The keywords could include, for example, "java," "program," "language," and "computer."

These keywords are sent to personal query manager 110, which allows the user 103 to modify or add to these keywords, if desired. It will be assumed, for sake of simplicity, that the user 103 does not modify the keywords. The keywords are sent to the query generator 120, which then formats one final query 121 as "java program language computer," where the boolean operation "and" or "or" is assumed to occur between words. Another final query 121 may be formatted by query generator 120 as "java and program and language and computer." Each of these final queries 121 is directed to an appropriate adapter 135, which then directs the final query to one or more information sources 180. Results 136 are returned to document retriever 140, which collects the results 136, organizes them by source (if desired), and sends them to user 143.

If the user decides to not select a category and just sends the request 106 as "java," then this query is passed through the personal query manager 110, to the query generator 120, which performs any needed formatting, through the adapters 135 and to the information sources 180. Results 136 are passed through document retriever 140, which collects and organizes the results per information sources 180 and then sends the organized result list on link 143.

During offline mode, the linguistic library 170 will pass keywords for each of the categories "computer language," "islands of Indonesia," and "types of coffee" to the personal query manager 110, which will forward each set of keywords to query generator 120, which then formats each query appropriately for the adapters 135. The adapters 135 send the queries to the appropriate information sources 180, which return results 136. The document retriever 140 determines how many results are returned for each information sources 180 and catalogs the results. This data is sent through link 141 to document analyzer 150, which analyzes the documents and scores the relevancy of the documents. The total number of returned documents for each information sources 180 and scores are sent to information source analyzer 160, which determines rankings of the information sources 180 for each of the queries.

Referring now to FIG. 2, a portion of FIG. 1 is shown in greater detail. Personal query manager 110 comprises a request handler 210, a search utility 220, and a query interface generator 215. The linguistic library 170 comprises one or more tables of general categories 235, user specific taxonomies 240, table of personal categories 245, and dictionaries 250.

A user request 106, which could be a user category description, category, or query, is sent to request handler 210. The request 106 is received by the request handler 210, which parses the user description and sends the parsed terms to the linguistic resources library 170 via search utility 220 and link 112. The search utility 220 finds the related terms and categories associated with the description or query in the request 106 as well as the most relevant information sources 180 that should be searched against the request 106. Additionally, the search utility 220 can find personal preferences stored in user profile/preferences 255. A search of the general categories 235 yields categories that have the same keywords or description as the user request 106. User specific taxonomies 240 are classifications specific to the user. A search of these will yield classifications used to broaden the request 106. A dictionary 250 provides definitions that may be used to broaden the request 106 or used to associate categories with the user request 106. It should be noted that a dictionary can contain thesaurus information. A table suitable for general categories 235 and personal categories 245 is shown in FIG. 3.

If the search by the search utility 220 returns at least one category and associated information sources 180, then this information is used to retrieve relevant documents. The linguistic library 170 generates terms related to the request 106 and returns the terms back to the personal query manager 110 through link 171. An expanded query is created by search utility 220 and linguistic library 170 and terms for the expanded query, or the expanded query itself, are passed through link 171 and shown to the user through link 107. At this point, user 105 may choose to modify these terms before they are submitted to the query generator 120. The final version of the keywords and query terms 115 are then submitted to the query generator 120, through query generator interface 215, where the adapters 170 are invoked to submit multiple search requests to various information sources 180 simultaneously. The query generator interface 215 sends keywords, or other terms determined from linguistic library 170, to the query generator 120.

Figure 3:
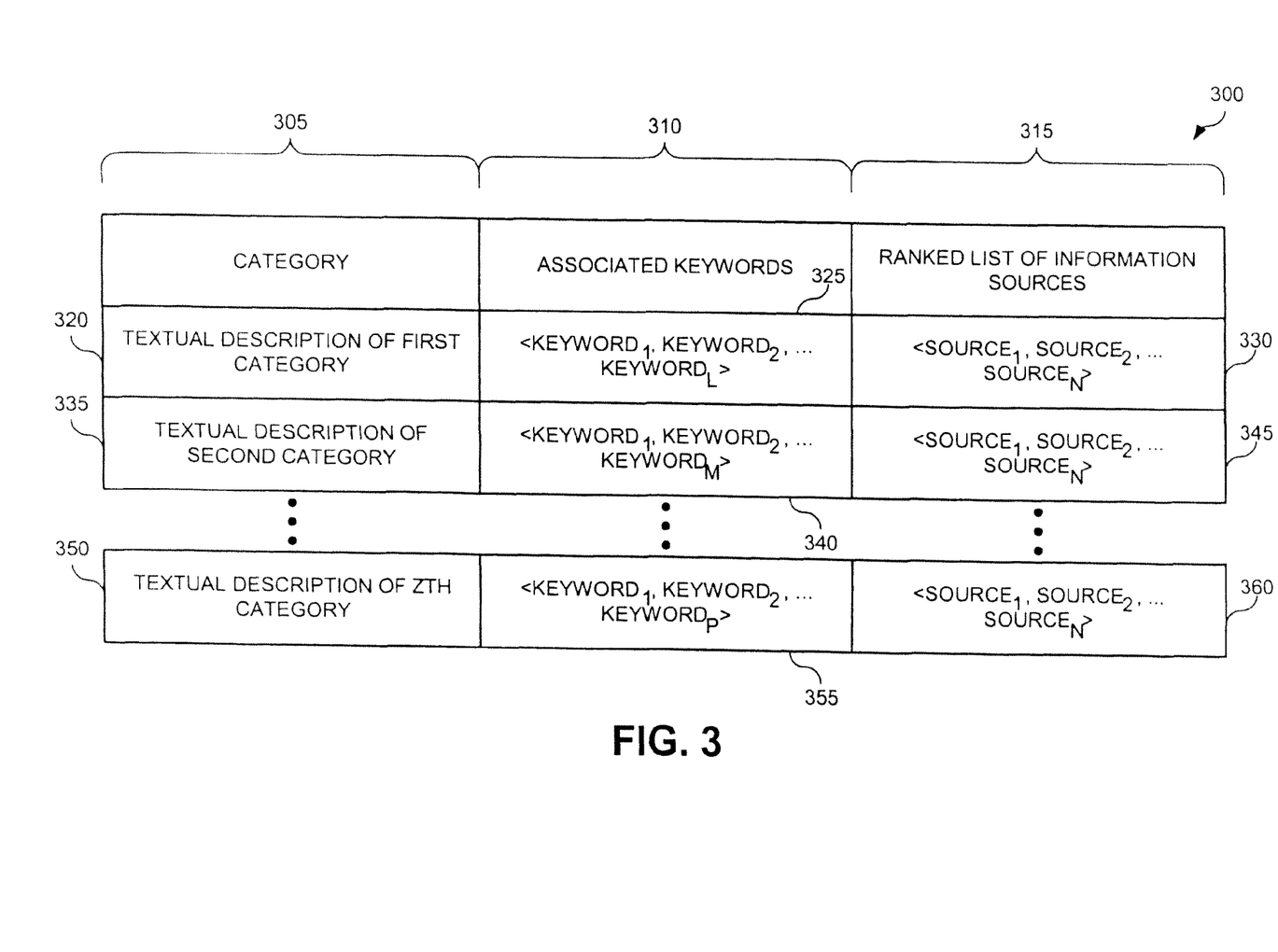
FIG. 3 is a block diagram of an exemplary table of personal categories, in accordance with one embodiment of the present invention.

Referring now to FIG. 3, an exemplary table of categories 300 is shown. The table of categories 300 may be the table of general categories 235 or the table of personal categories 245. As noted above, the personalized and adaptive search service 100 generally will come with a number of categories in the table of general categories 235, and the user (or users) can add his or her own additional categories in the table of personal categories 245. FIG. 3 shows the structure of a table to be used to store and retrieve categories and associated keywords and information sources. In table of categories 300, the first column 305 is for the textual description of the user category, the second column 310 is for the array of keywords that are associated with the category description, and the last column 315 is for the list of information sources that are sorted based on their rank and related to the category described in the first column. Category 320 corresponds to L keywords 325 and ranked list 330; category 335 corresponds to M keywords 340 and ranked list 345; and category 350 corresponds to P keywords 355 and ranked list 360. In the example of FIG. 3, there are Z categories.

The user queries and descriptions are first checked against the table of personal categories 245 and the table of general categories 235. If there exists a category, in either of these tables, that is found when compared to a user query or description, then associated information sources in a corresponding ranked list 315 are used to retrieve information. Otherwise, a new category is created in the table of personal categories 245 by querying the user as to the textual description of the category and populating another row in the table. The keywords 310 for the new row in the table of personal categories 245 come from the table of general categories 235 and dictionary 250. The dictionary is used to determine words related to the newly added textual description of the category. These words are then used to determine similar categories in the table of general categories 235, and the keywords for the similar categories from table of general categories 235 are added to the table of personal categories 245 as keywords. The newly added keywords are generally shown to the user, who can then determine to add, delete, or modify the keywords.

In the example of FIG. 3, each ranked list 315 of information sources 180 is in order of information source and not ranking. However, the list may be placed in order of ranking if desired. One benefit to having the ranked lists 315 ordered in order of information source is that it is easier to remove or add sources.

There are multiple ways of ranking information sources 180. One possible way of ranking the information sources 180 is based on the number of documents returned from each information source 180. The information source 180 that returns more documents is ranked higher than other information sources 180 that return less number of documents. As an example, source A that returns 100 documents on one subject is ranked higher than source B that returns 50.

Figure 4:
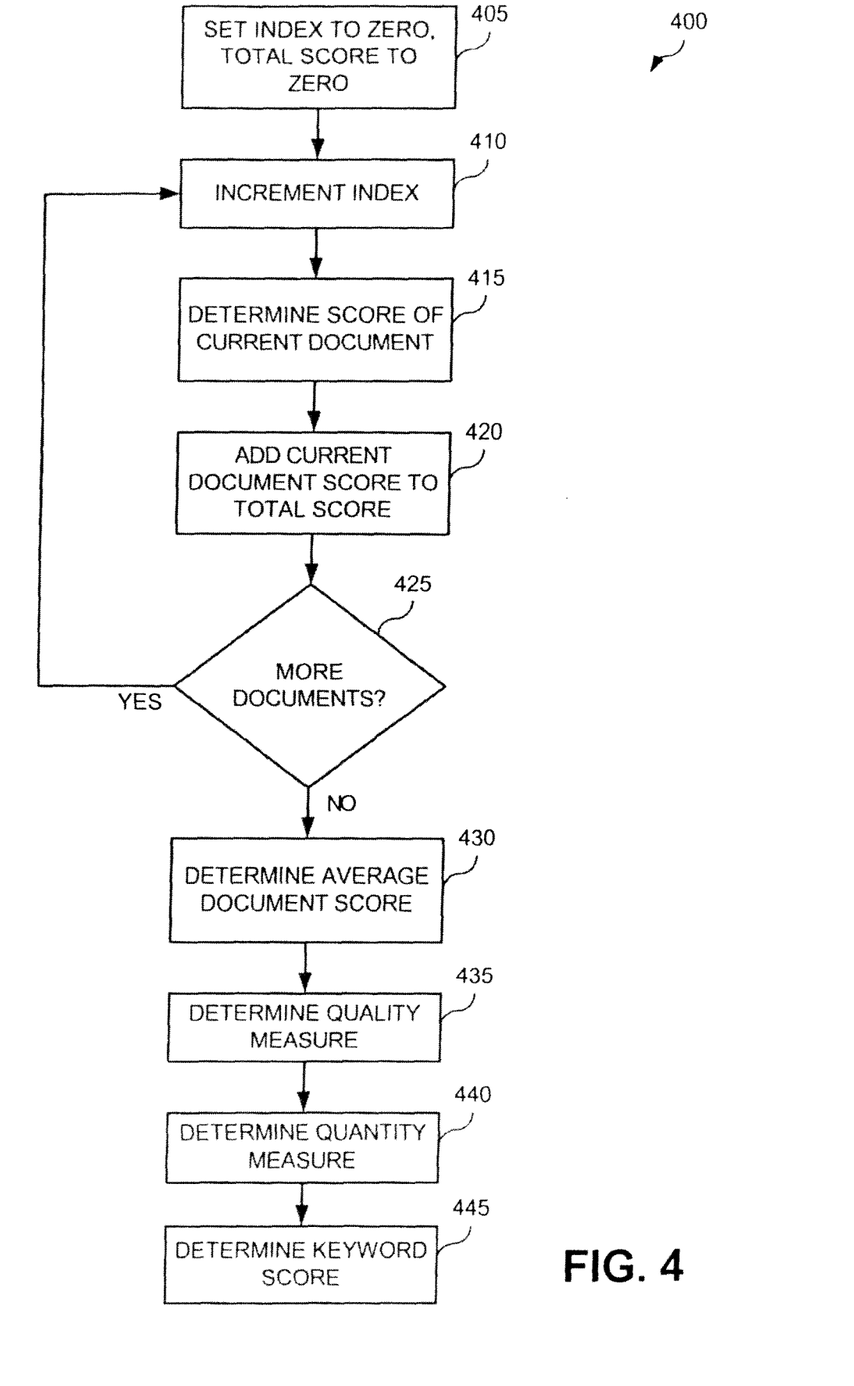
FIG. 4 is an exemplary method performed by an information source analyzer for determining keyword scores that are then used to rank information sources, in accordance with one embodiment of the present invention.

However, the relevance of the returned documents is important. Another ranking policy that takes relevancy into consideration works as is shown in FIG. 4. Broadly, each document is assigned a relevance score by the source. During the ranking process of method 400, a keyword score for a particular keyword can be calculated based on a formula which defines the keyword score as the linear combination of the number of documents and their mean relevancy. Method 400 determines a keyword score for each keyword and should be run once for each keyword and information source 180.

Method 400 begins in step 405, when an index and a total score are set to zero. In step 410, the index is incremented. In step 415, a score of the current document is determined. This score is determined for a particular keyword or query. Generally, the information source analyzer 160 performs method 400 and will simply retrieve the score for the document. In other words, the score has already been determined by the document analyzer 150 for the keyword and the information source analyzer 160 just retrieves the score. Alternatively, it is possible to have the document analyzer 150 determine the score in step 415 and have the document analyzer 150 provide the score to information source analyzer 160. It is also possible to have the information source analyzer 160 determine the score, if desired.

In step 420, the current score for the keyword is added to the total document score. In step 425, it is determined if there are more documents. If there are more documents, the method 400 continues in step 410, otherwise step 430 is performed. The loop of steps 410 through 425 will create a total document score that is a linear addition of all of the scores for documents that contain a keyword and that are from a single source.

In step 430, an average document score is created for the information source by dividing the total score by the number of documents returned. A measure of quality is determined in step 435 using the following formula:

$$a*\text{average document score},$$

where "a" is a constant. A measure of quantity is determined in step 440 by using the following formula:

$$b*\text{number of documents returned},$$

where "b" is another constant. The constants a and b are to be determined depending on the importance of quality or the quantity. If the quality (i.e., relevance) is not important, then b=0; on the other hand, if the quantity (i.e., number of documents) is not important, then a=0. The values of a and b can be determined by users as part of their profile. Here, it is assumed that the document scores retrieved from different sources are normalized. In step 445, a keyword score is determined by the following, equation:

$$\text{Keyword Score} = (\text{Measure of Quality}) + (\text{Measure of Quantity}), \text{ or}$$

$$= a*\text{average document score} + b*\text{number of documents returned}$$

Figure 5:
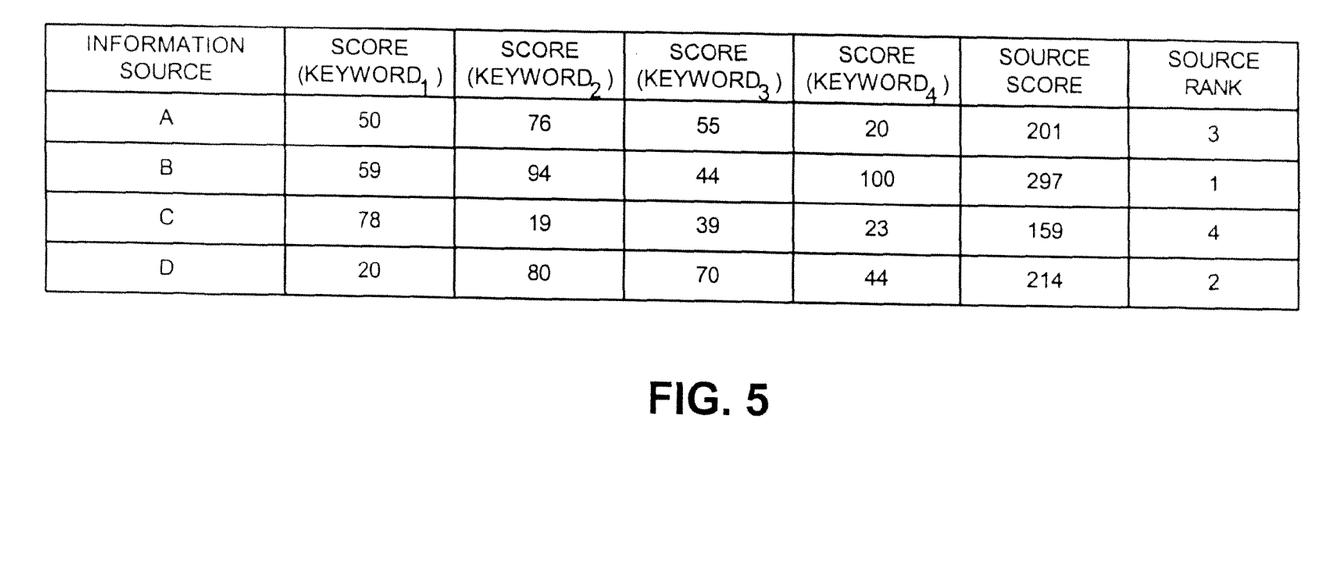
FIG. 5 is a representation of how information sources are scored and ranked by the information source analyzer, in accordance with one embodiment of the present invention.

FIG. 5 shows a representation of how information sources are scored and ranked. The information source A is scored based on all the keywords that represent the category of choice. In this example, there are four keywords, $keyword_1$ through $keyword_4$, for the category being examined. The scores of source A are 50, 76, 55 and 20, for the four keywords, respectively. Each score is determined through method 400. Hence, the total score of source A is 201, which is a simple addition of each of the keyword scores, that ranks this source as the 3rd after source B and D. The rank is determined from the source scores; the higher the score, the lower the rank in this example (i.e., lower scores are better).

More complex analyses may be used in the techniques described in FIG. 5. For instance, weighting may be applied to the scores of each keyword, such that one keyword could be weighted higher than another. Any technique for determining an overall score for a query having keywords may be used.

Figure 6:
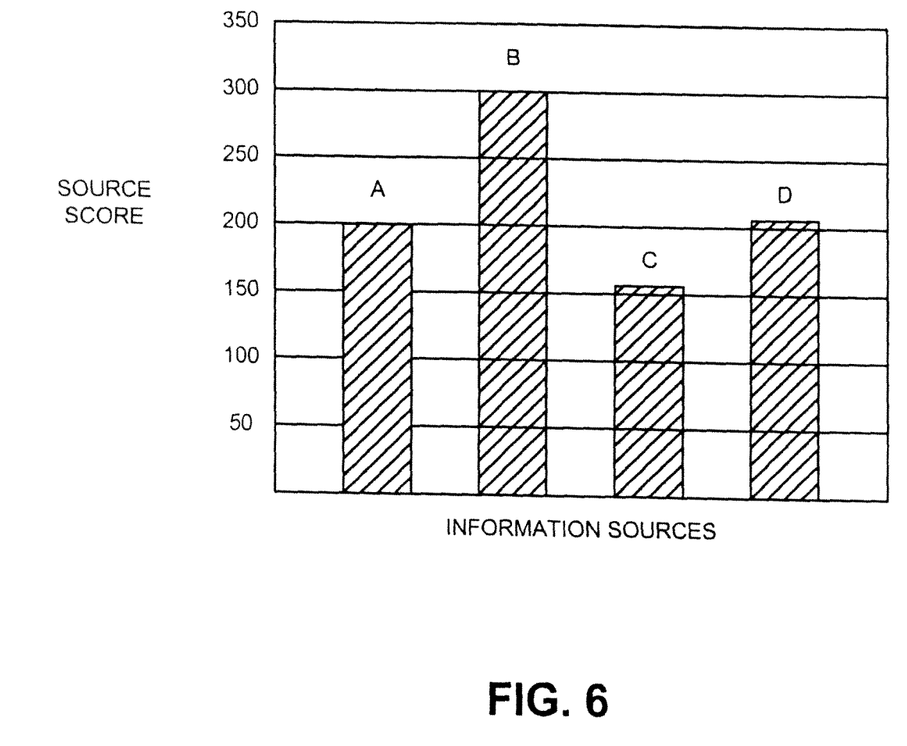
FIG. 6 is an exemplary chart used to illustrate the source ranking shown in FIG. 5.

FIG. 6 shows a representation of scoring of the sources. It should be noted that the scores themselves may be used as the ranking of the information sources.

Figure 7:
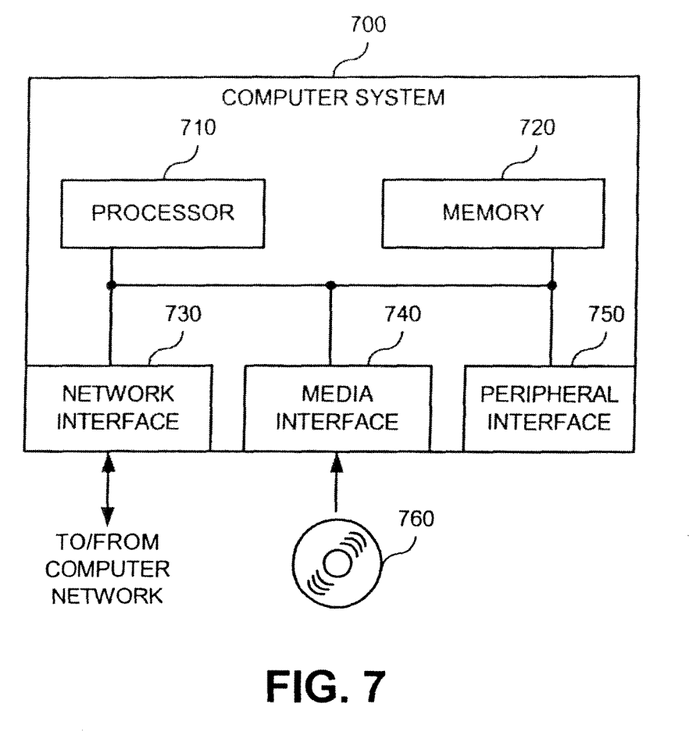
FIG. 7 is an exemplary computer system suitable for implementing a personalized and adaptive search service, in accordance with one embodiment of the present invention.

Turning now to FIG. 7, a block diagram is shown of a computer system 700 for performing the methods and techniques of a personalized and adaptive search service 100 in accordance with one embodiment of the present invention. Computer system 700 is shown interacting with a Digital Versatile Disk (DVD) 760 and a computer network. Computer system 700 comprises a processor 710, a memory 720, a network interface 730, a media interface 740 and a peripheral interface 750. Network interface 730 allows computer system 700 to connect to a network, while media interface 740 allows computer system 700 to interact with media such as a hard drive or DVD 760. Peripheral interface 750 is an interface that interacts with monitors, mice, keyboards, and other devices to enable human interaction with computer system 700.

As is known in the art, the methods and apparatus discussed herein may be distributed as an article of manufacture that itself comprises a computer-readable medium having computer-readable code means embodied thereon. The computer-readable program code means is operable, in conjunction with a computer system such as computer system 700, to carry out all or some of the steps to perform the methods or create the apparatuses discussed herein. The computer-readable medium may be a recordable medium (e.g., floppy disks, hard drives, optical disks such as DVD 760, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as DVD 760.

Memory 720 configures the processor 710 to implement the methods, steps, and functions disclosed herein. The memory 720 could be distributed or local and the processor 710 could be distributed or singular. The memory 720 could be implemented as an electrical, magnetic or optical memory, or any combination of these or other types of storage devices. Moreover, the term "memory" should be construed broadly enough to encompass any information able to be read from or written to an address in the addressable space accessed by processor 710. With this definition, information on a network, accessible through network interface 730, is still within memory 720 because the processor 710 can retrieve the information from the network. It should be noted that each distributed processor that makes up processor 710 generally contains its own addressable memory space. It should also be noted that some or all of computer system 700 can be incorporated into an application-specific or general-use integrated circuit.

It is to be understood that the embodiments and variations shown and described herein are merely illustrative of the principles of this invention and that various modifications may be implemented by those skilled in the art without departing from the scope and spirit of the invention.

What is claimed is:

1. A computer-implemented method, comprising:
   sending a query to one or more information sources associated with a category comprising one or more terms, wherein said one or more information sources are identified by a ranked list of information sources, and wherein said ranked list is generated by ranking a plurality of information sources based on scores for results returned by said plurality of information sources in response to a ranking query comprising at least one keyword and generated from said category, wherein said ranking comprises:
      receiving the results from each of the plurality of information sources; and
      determining the scores for the results by (i) determining a quality measure for each keyword, (ii) determining a quantity measure for each keyword, and (iii) determining a score for each keyword based on the quality measure and the quantity measure; and
   obtaining results from said one or more information sources.

2. The method of claim 1, wherein the step of determining a quality measure further comprises the steps of:
   determining how many times each keyword appears in each document accessible through the results from one of the information sources;
   determining how many documents are accessible through the results from one of the information sources; and
   dividing the number of times each keyword appears by the number of documents to determine the quality measure.

3. The method of claim 2, wherein the step of determining the scores for the results further comprises the steps of:
   repeating the steps of determining a quality measure, determining a quantity measure, and determining a score for each keyword and each information source; and
   determining source scores for each source by adding the scores for each keyword.

4. The method of claim 3, wherein the step of ranking the information sources further comprises the step of using the source scores to rank the information sources.

5. The method of claim 1, further comprising the steps of:
   storing the rankings for the information sources;
   storing the query; and
   performing the steps of sending a query and ranking the information sources for the stored query.

6. The method of claim 5, wherein a user enters the query.

7. The method of claim 5, wherein:
   the step of storing the query further comprises the step of storing a plurality of queries;
   the step of storing the rankings for the information sources further comprises the step of storing a set of rankings for each of the queries;
   the method further comprises the step of selecting a query; and
   the step of performing the steps of sending a query and ranking the information sources for the stored query further comprises the step of performing the steps of sending a query and ranking the information sources for the selected query.

8. An apparatus comprising:
   one or more memories that store computer-readable code; and
   one or more processors operatively coupled to the one or more memories, the one or more processors configured to implement the computer-readable code, the computer-readable code configured to:
   send a query to one or more information sources associated with a category comprising one or more terms, wherein said one or more information sources are identified by a ranked list of information sources, and wherein said ranked list is generated by ranking a plurality of information sources based on scores for results returned by said plurality of information sources in response to a ranking query comprising at least one keyword and generated from said category, wherein said ranking comprises:
      receiving the results from each of the plurality of information sources; and
      determining the scores for the results by (i) determining a quality measure for each keyword, (ii) determining a quantity measure for each keyword, and (iii) determining a score for each keyword based on the quality measure and the quantity measure; and
   obtain results from said one or more information sources.

9. The apparatus of claim 8, wherein the step of determining a quality measure further comprises the steps of:
   determining how many times each keyword appears in each document accessible through the results from one of the information sources;
   determining how many documents are accessible through the results from one of the information sources; and
   dividing the number of times each keyword appears by the number of documents to determine the quality measure.

10. The apparatus of claim 9, wherein the step of determining the scores for the results further comprises the steps of:

repeating the steps of determining a quality measure, determining a quantity measure, and determining a score for each keyword and each information source; and determining source scores for each source by adding the scores for each keyword.

11. The apparatus of claim 10, wherein the step of ranking the information sources further comprises the step of using the source scores to rank the information sources.

12. The apparatus of claim 8, wherein the computer-readable code is further configured to:

store the rankings for the information sources;

store the query; and perform the steps of sending a query and ranking the information sources for the stored query.

13. The apparatus of claim 12, wherein a user enters the query.

14. The apparatus of claim 12, wherein:

the step of storing the query further comprises the step of storing a plurality of queries;

the step of storing the rankings for the information sources further comprises the step of storing a set of rankings for each of the queries;

the method further comprises the step of selecting a query; and the step of performing the steps of sending a query and ranking the information sources for the stored query further comprises the step of performing the steps of sending a query and ranking the information sources for the selected query.

\* \* \* \* \*